United States Patent
Tammana et al.

(10) Patent No.: US 12,513,609 B2
(45) Date of Patent: Dec. 30, 2025

(54) RADIO TECHNOLOGY SELECTION FOR A COMMUNICATION SESSION

(71) Applicant: T-Mobile Innovations LLC, Overland Park, KS (US)

(72) Inventors: Deepak Nadh Tammana, Bothell, WA (US); Roopesh Kumar Polaganga, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 520 days.

(21) Appl. No.: 17/645,504

(22) Filed: Dec. 22, 2021

(65) Prior Publication Data

US 2023/0199630 A1 Jun. 22, 2023

(51) Int. Cl.
*H04W 24/08* (2009.01)
*H04W 48/18* (2009.01)

(52) U.S. Cl.
CPC ........... *H04W 48/18* (2013.01); *H04W 24/08* (2013.01)

(58) Field of Classification Search
CPC . H04W 48/18; H04W 24/08; H04W 36/0058; H04W 24/10; H04W 28/0215; H04L 51/16
See application file for complete search history.

(56) References Cited

U.S. PATENT DOCUMENTS

| | | | |
|---|---|---|---|
| 11,197,217 B1* | 12/2021 | Vivanco | H04L 5/0091 |
| 11,350,303 B2* | 5/2022 | Yan | H04W 28/0925 |
| 11,490,282 B2* | 11/2022 | Jha | H04W 36/0069 |
| 11,758,600 B1* | 9/2023 | Marupaduga | H04W 76/15 370/230 |
| 12,016,047 B1* | 6/2024 | Polaganga | H04W 72/541 |
| 12,389,295 B2* | 8/2025 | Zhu | H04W 36/22 |
| 2018/0020418 A1* | 1/2018 | Chandramouli et al. H04W 60/005 |
| 2019/0069205 A1* | 2/2019 | Lee et al. | H04W 36/00835 |
| 2020/0383155 A1* | 12/2020 | Pati | H04W 76/15 |
| 2020/0389828 A1* | 12/2020 | Venkataraman et al. H04W 36/14 |
| 2021/0267000 A1* | 8/2021 | Jain | H04W 8/245 |
| 2021/0337550 A1* | 10/2021 | Kumar | H04W 16/14 |
| 2021/0345454 A1* | 11/2021 | Dhanapal | H04W 76/27 |

(Continued)

FOREIGN PATENT DOCUMENTS

| | | | | |
|---|---|---|---|---|
| KR | 20230128280 A | * | 9/2023 | H04W 64/00 |
| WO | WO-2018127622 A1 | * | 7/2018 | H04W 72/51 |

(Continued)

*Primary Examiner* — Chirag G Shah
(74) *Attorney, Agent, or Firm* — Shook, Hardy & Bacon L.L.P.

(57) ABSTRACT

The technology described herein improves communication quality and device efficiency by selecting an initial radio technology (e.g., LTE, 5G) for use in an EN-DC communication session between a user equipment (UE) and a communication network. The radio technology may be selected by a network node (e.g., eNodeB) based on a geographic location of the UE within a service area and performance measures calculated for geographic location. In some geographic areas, the 5G leg may perform below a threshold quality measure, while the LTE leg performs well. In these situations, designating the LTE leg as the radio technology for the initial user-data layer may yield a better overall performance (e.g., data throughput) than using the 5G technology for the initial user-data layer leg.

20 Claims, 6 Drawing Sheets

(56) References Cited

U.S. PATENT DOCUMENTS

| | | | | |
|---|---|---|---|---|
| 2021/0400754 A1* | 12/2021 | Bhojkumar | ............ | H04W 76/16 |
| 2022/0030497 A1* | 1/2022 | Bhatti et al. | ........... | H04W 24/02 |
| 2023/0112670 A1* | 4/2023 | Peitzer | ................. | H04W 76/34 |
| | | | | 370/252 |

FOREIGN PATENT DOCUMENTS

| | | | | |
|---|---|---|---|---|
| WO | WO-2020209861 A1 * | 10/2020 | ............ | H04W 48/18 |
| WO | WO-2021225703 A1 * | 11/2021 | ............ | H04W 16/14 |
| WO | WO-2022056810 A1 * | 3/2022 | ........ | H04W 36/0058 |

* cited by examiner

RADIO TECHNOLOGY SELECTION FOR A COMMUNICATION SESSION

CROSS-REFERENCE TO RELATED APPLICATIONS

None.

SUMMARY

The technology described herein attempts to determine and select the optimal initial radio access technology for use with the initial user-data leg. The radio technology may be selected by a network node (e.g., eNodeB) based on a geographic location of the UE within a service area provided by the network node. The technology described herein is applicable to areas where multiple radio technologies are available and an EN-DC communication session is initiated. Areas where two or more radio technologies are available may be described as overlapping coverage areas herein. For example, an EN-DC communication session may comprise an LTE leg and a 5G leg. The LTE leg may serve as the anchor leg through which signaling and communication session management occurs, while the 5G and LTE legs are both available for user data transfer.

The comparatively large amount of data that can be communicated over a 5G leg makes the use of a 5G leg desirable when available. In many communication networks that have 5G capabilities, the use of a 5G leg as the initial user-data leg may be the default arrangement. The use of a default radio-access technology does not account for variable quality in different geographic areas of a node's coverage area. Various factors, such as interference, can cause coverage quality to differ throughout a coverage area. The technology described herein makes a dynamic selection of the optimal radio technology for the initial leg based on a location of the UE and historical quality performance of the radio technologies at the UE's location.

Choosing the optimal radio access technology for the initial leg can avoid a need for the second leg. The use of a single leg, rather than two legs, saves resources. For example, maintaining an active 5G leg that is not performing up to capacity may use more energy on the UE (depleting a battery) than using an LTE leg since maintaining a single leg may require less radio usage than maintaining two legs (i.e., both a 5G and LTE leg). Similarly, the 5G leg that is not performing up to capacity makes an inefficient use of limited radio frequencies available to a 5G node. For example, the radio frequency dedicated for use carrying a below capacity 5G leg in one part of a coverage area could be used for a full capacity 5G leg in a different part of the coverage area.

The first step of the selection process is identifying geographic areas with below threshold 5G performance and/or LTE performance. The geographic areas may take the form of hexbins of a various sizes. In one aspect, a service provider generates a hexbin map for its service areas. Each access node may use the same hexbin map to define geographic subunits of the node's service area. However, different nodes may assign different performance scores to the same hexbin based on unique performance data received by the node. Each node may gather performance data from UE's operating in a coverage area provided by the node. The performance data may be analyzed to determine areas with below a threshold performance measure. These areas (e.g. hexbins) may be designated as low performance geographic subunits of a coverage area. The nodes making the performance quality determination may not provide 5G coverage themselves, but may still gather 5G performance data through the LTE leg provided by the node. LTE nodes that manage a 5G connection provided by a 5G node located elsewhere, may be described as non co-located LTE nodes. In this may, a 5G quality score and a LTE quality score may be generated for each geographic subunit.

Once the subunits of a node's overlapping coverage area (an area where both LTE and 5G coverage are available) are designated as either high or low performing, the designations can be used to determine whether LTE and 5G should be used as the radio access technology for the initial user-data leg. In areas where both LTE and 5G are low performing, LTE may be selected as a default. In areas where both LTE and 5G are high performing, 5G may be selected as a default. The 5G configuration message informs the UE how to set up a 5G communication session from the UE's current location. The configuration message may specify a radio access technology for the initial-user data leg.

BRIEF DESCRIPTION OF THE DRAWINGS

Illustrative embodiments of the present invention are described in detail below with reference to the attached drawing figures, and wherein.

DETAILED DESCRIPTION

Figure 1:
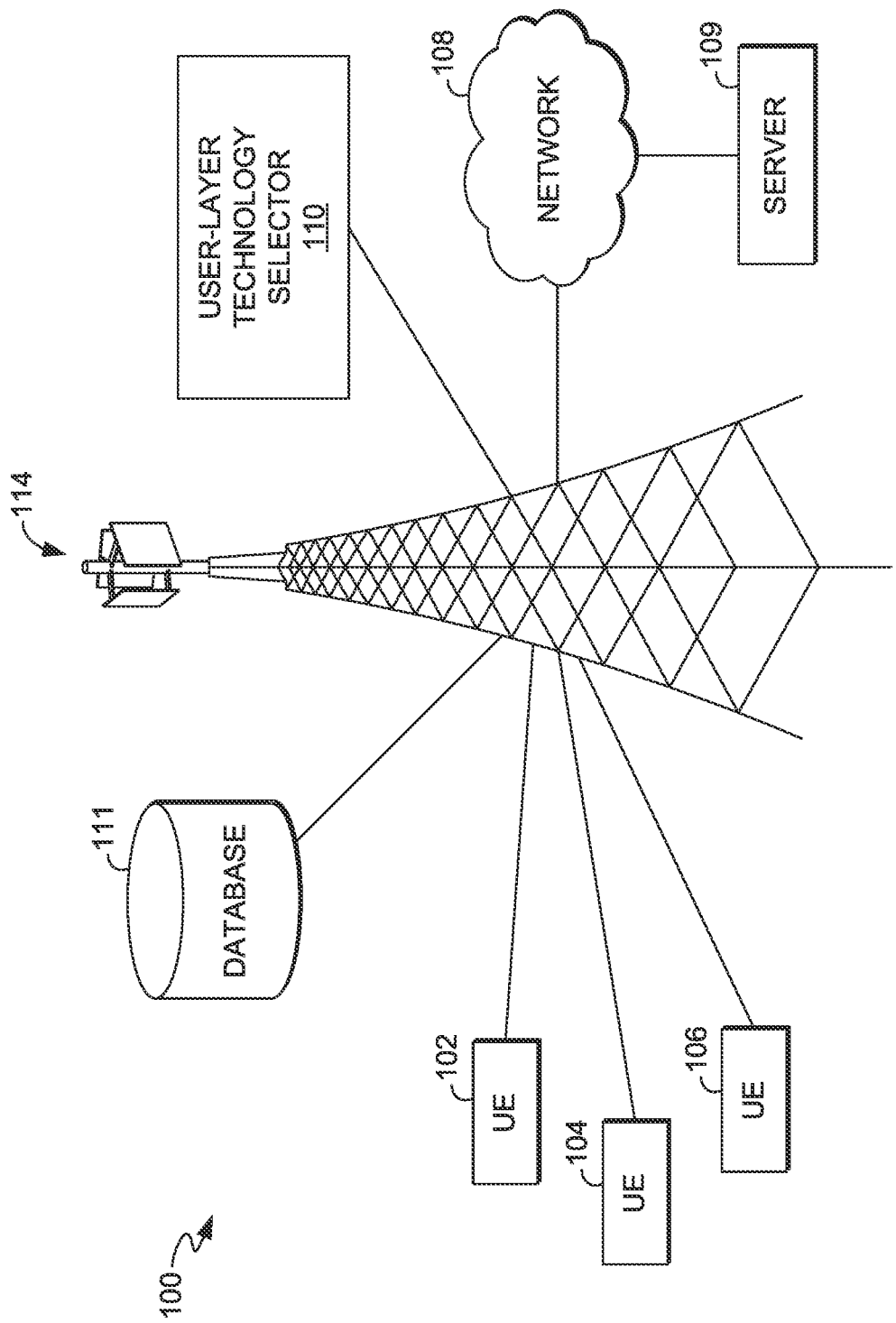
FIG. 1 depicts an exemplary wireless telecommunications network, according to an implementation of an embodiment of the present invention.

The subject matter of embodiments of the invention is described with specificity herein to meet statutory requirements. However, the description itself is not intended to limit the scope of this patent. Rather, the inventor has contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication |

-continued

| | |
|---|---|
| | System |
| 5G | Fifth-Generation Cellular Communication System |
| BS | Base Station |
| BTS | Base Transceiver Station |
| CD-ROM | Compact Disk Read Only Memory |
| CDMA | Code Division Multiple Access |
| CDMA2000 | Code Division Multiple Access 2000 |
| DL | Downlink |
| eNodeB | Evolved Node B |
| EN-DC | E-UTRA (Evolved-Universal Terrestrial Radio Access) NR (New Radio) - Dual Connectivity |
| FDD | Frequency Division Duplex |
| gNodeB | Next Generation Node B |
| GPRS | General Packet Radio Service |
| GSM | Global System for Mobile communications |
| DVD | Digital Versatile Discs |
| EEPROM | Electrically Erasable Programmable Read Only Memory |
| HSDPA | High-Speed Downlink Packet Access |
| IoT | Internet of Things |
| LED | Light Emitting Diode |
| LTE | Long Term Evolution |
| MD | Mobile Device |
| MME | Mobility Management Entity |
| NR | New Radio |
| PC | Personal Computer |
| PCS | Personal Communications Service |
| PDA | Personal Digital Assistant |
| RAM | Random Access Memory |
| RF | Radio-Frequency |
| RFI | Radio-Frequency Interference |
| ROM | Read Only Memory |
| SMS | Short Message Service |
| TDD | Time Division Duplex |
| TDMA | Time Division Multiple Access |
| TXRU | Transceiver (or Transceiver Unit) |
| UE | User Equipment |
| UL | Uplink |
| UMTS | Universal Mobile Telecommunications Service |
| QCI | Quality of Service Class Identifier |
| VoLTE | Voice over Long-Term Evolution |
| WCDMA | Wideband Code Division Multiple Access |
| WiMAX | Worldwide Interoperability for Microwave Access |

Further, various technical terms are used throughout this description. An illustrative resource that fleshes out various aspects of these terms can be found in Newton's Telecom Dictionary, 31st Edition (2018).

At a very high level, the technology described herein improves communication quality and device efficiency by selecting an optimal radio technology (e.g., LTE, 5G) for use in setting up an initial user-data leg of an EN-DC communication session between a UE and a communication network. In an EN-DC communication session, an LTE connection may serve as the anchor leg through which signaling and communication session management occurs, while user data is communicated over both a 5G user-data leg and a LTE user-data leg. In some instances of high data throughput, user-data communication is split between a 5G user-data leg and a LTE user-data leg. During set up of the EN-DC communication session, either the 5G user-data leg or the LTE user-data leg will be designated as the initial leg. The initial leg may be used to communicate data until a threshold amount of data transfer over the initial leg is reached. Once the threshold is reached, then data transfer over the additional user-data leg may begin. Reaching a data threshold is just one circumstance that may trigger use of the additional user-data leg. In many communication sessions, only one leg is used, which would be the initial leg. A secondary or additional user-data leg using the other radio technology (the technology not selected for the initial leg) may be used in some circumstances.

The technology described herein attempts to determine and select the optimal initial radio access technology for use with the initial user-data leg. The radio technology may be selected by a network node (e.g., eNodeB) based on a geographic location of the UE within a service area provided by the network node. The technology described herein is applicable to areas where multiple radio technologies are available and an EN-DC communication session is initiated. Areas where two or more radio technologies are available may be described as overlapping coverage areas herein. For example, an EN-DC communication session may comprise an LTE leg and a 5G leg. The LTE leg may serve as the anchor leg through which signaling and communication session management occurs, while the 5G and LTE legs are both available for user data transfer.

The comparatively large amount of data that can be communicated over a 5G leg makes the use of a 5G leg desirable when available. In many communication networks that have 5G capabilities, the use of a 5G leg as the initial user-data leg may be the default arrangement. The use of a default radio-access technology does not account for variable quality in different geographic areas of a nodes coverage area. Various factors, such as interference, can cause coverage quality to differ throughout a coverage area. The technology described herein makes a dynamic selection of the optimal radio technology for the initial leg based on a location of the UE and historical quality performance of the radio technologies at the location.

The selection of the radio access technology may also include selecting between different 5G services, such as 5G services provided on different frequency bands. The technology described herein may avoid use of an initial 5G user-data leg when the 5G connection is likely (based on historical data) to fall below a quality threshold (e.g., below a threshold availability, retainability, and/or throughput). Instead of the 5G user-data leg, the LTE user-data leg may be configured as the initial user-data leg. Whether a 5G connection is likely to fall below a quality threshold may be determined by analyzing performance data gathered from UEs in different geographic locations. Quality measures may be determined for different subunits of a coverage area and used to select the optimal radio technology for a UE's location.

In some geographic areas, the 5G leg may perform below the threshold quality due to interference or some other cause, while the LTE leg performs well. In these situations, designating the LTE leg as the initial user-data leg may yield a better performance (e.g., data throughput) than designating the 5G leg as the initial user-data leg. In essence, the theoretical benefit of the higher data throughput provided by the 5G leg may not be consistently realized in certain geographic locations. In these locations, an LTE leg could perform better than a 5G leg in several quality metrics, such as throughput. For example, if the 5G leg is the initial leg and has poor throughput, then the LTE user-data leg may begin carrying data almost immediately, even when relatively little data is being communicated overall. It would be optimal to make the LTE leg the initial leg in this circumstance to avoid use of two user-data legs, and use just one instead. When the LTE leg is the initial user-data leg, then the 5G leg would not be needed in many typical (from a data transmission perspective) communication sessions.

Choosing the optimal radio access technology for the initial leg can avoid a need for the second leg. The use of a single leg, rather than two legs, saves resources. For example, maintaining an active 5G leg that is not performing up to capacity may use more energy on the UE (depleting a battery) than using an LTE leg since maintaining a single leg may require less radio usage than maintaining two legs (i.e., both a 5G and LTE leg). Similarly, the 5G leg that is not performing up to capacity makes an inefficient use of limited radio frequencies available to a 5G node. For example, the radio frequency dedicated for use carrying a below capacity 5G leg in one part of a coverage area could be used for a full capacity 5G leg in a different part of the coverage area.

The first step of the selection process is identifying geographic areas with below threshold 5G performance and/or LTE performance. The geographic areas may take the form of hexbins of a various sizes. In one aspect, a service provider generates a hexbin map for its service areas. Each access node may use the same hexbin map to define geographic subunits of the node's service area. However, different nodes may assign different performance scores to the same hexbin based on unique performance data received by the node. Each node may gather performance data from UE's operating in a coverage area provided by the node. The performance data may be analyzed to determine areas with below a threshold performance measure. These areas (e.g. hexbins) may be designated as low performance geographic subunits of a coverage area. The nodes making the performance quality determination may not provide 5G coverage themselves, but may still gather 5G performance data through the LTE leg provided by the node. LTE nodes that manage a 5G connection provided by a 5G node located elsewhere, may be described as non co-located LTE nodes. In this may, a 5G quality score and a LTE quality score may be generated for each geographic subunit.

An area designated as a low performance area by one node may be designated as a high performance node by a second node that also provides coverage to the same hexbin. For example, a first and second node may both provide LTE coverage to an area with 5G coverage provided by third node. It may be that the frequencies used by the first node cause interference with the 5G coverage while the frequencies used by the second node do not. In this scenario, the first node may designate the area as a low performing area, while the second node designated the same area as a high-performing area.

Once the subunits of a node's overlapping coverage area (an area where both LTE and 5G coverage are available) are designated as either high or low performing, the designations can be used to determine whether LTE and 5G should be used as the radio access technology for the initial user-data leg. In areas where both LTE and 5G are low performing, LTE may be selected as a default. In areas where both LTE and 5G are high performing, 5G may be selected as a default. The 5G configuration message informs the UE how to set up a 5G communication session from the UE's current location. The configuration message may specify a radio access technology for the initial-user data leg.

As used herein, user equipment (UE) (also referenced herein as a user device) can include any device employed by an end-user to communicate with a wireless telecommunication network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gauge, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point. A UE can be, in an embodiment, similar to computing device 600 described herein with respect to FIG. 6.

As used herein, a user-data leg transports content (e.g., video, sound, images). User data may be transported between the network and a UE with data radio bearers (DRBs). EN-DC supports Master Cell Group (MCG) DRBs, MCG split DRBs, and Secondary Cell Group (SCG) DRBs. The user-data leg may also be described as a user plane. The user-data leg may a 5G or LTE leg.

The control leg or control plane carries control signaling. In EN-DC operation, a mobile device must comprehend both the LTE and NR RRC control signaling. To transport these RRC messages between the network and a mobile device, a set of signaling radio bearers (SRBs) are used possibly including, but not limited to, Master Cell Group (MCG) SRB (SRB1, SRB2), Split SRB (SRB1+SRB1S, SRB2+SRB2S), and Secondary Cell Group (SCG) SRB (SRB3).

Referring to FIG. 1, an exemplary network environment suitable for use in implementing embodiments of the present disclosure is provided. Such a network environment as illustrated in FIG. 1 is designated generally as network environment 100. Network environment 100 is but one example of a suitable network environment and is not intended to suggest any limitation as to the scope of use or functionality of the disclosure. Neither should network environment 100 be interpreted as having any dependency or requirement relating to any one or combination of components illustrated.

Network environment 100 includes user devices 102, 104, and 106, access point 114 (which may be a cell site, node, base transceiver station (also known as a base station), communication tower, a small cell, or the like), network 108, server 109, initial radio technology selector 110, and database 111. In network environment 100, user devices can take on a variety of forms, such as a personal computer (PC), a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the server 109 or the computing device 600 of FIG. 6) that communicates via wireless communications with the access point 114 in order to interact with a public or private network. In this regard, the user device can be any mobile computing device that communicates by way of a wireless network, for example, a 1× circuit voice, a 3G network (e.g., CDMA, CDMA2000, WCDMA, GSM, UMTS), a 4G network (WiMAX, LTE, HSDPA), a 5G network, or any other type of network.

In some cases, the user devices 102, 104, and 106 in network environment 100 can optionally utilize network 108 to communicate with other computing devices (e.g., a mobile device(s), a server(s), a personal computer(s), etc.) through access point 114. The network 108 may be a telecommunications network(s), or a portion thereof. A telecommunications network might include an array of devices or components (e.g., one or more base stations), some of which are not shown. Those devices or components may form network environments similar to what is shown in FIG. 1, and may perform methods in accordance with the present disclosure. Components, such as terminals, links, and nodes (as well as other components) can provide connectivity in various implementations. Network 108 can include multiple networks, as well as being a network of networks, but is shown in more simple form so as to not obscure other aspects of the present disclosure.

Continuing, network 108 can be part of a telecommunication network that connects subscribers to their immediate service provider. In some instances, network 108 can be associated with a telecommunications provider that provides services to user devices 102, 104, and 106. For example, network 108 may provide voice, SMS, video, or data services to user devices corresponding to users that are registered or subscribed to utilize the services provided by a telecommunications provider. Similarly, network 108 may provide services to user devices that correspond to relays, fixed sensors, internet of things (IoT) enabled devices, or any other device that provide connectivity or data to other devices. Network 108 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network. In aspects, the network 108 may enable communication over both TDD and FDD technology.

Generally, access point 114 is configured to communicate with user devices, such as user devices 102, 104, and 106 that are located within the geographical area, or cell, covered by radio antennas of a cell site (i.e. access point 114). Access point 114 can include one or more base stations (such as a gNodeB), base transmitter stations, radios, antennas, antenna arrays, power amplifiers, transmitters/receivers, digital signal processors, control electronics, GPS equipment, and the like. Access point 114 can include a wireless communications station that is installed at a fixed location, (e.g., a telecommunication tower) or a mobile base station (e.g., small cell) in some embodiments. In some embodiments, access point 114 also includes or is associated with an LTE System Manager (LSM) configured to manage a master list (e.g., a table) of amplitude weights. The list of amplitude weights may include a plurality of amplitude, phase, and power weights applicable to a plurality of antennas, antenna model numbers, radios, tilt angles of antennas, and the like. The listing may also include amplitude, phase, and power weights applicable to various broadcast configurations, such as multi-beam or unified beam. Illustrative wireless telecommunications technologies include CDMA, CDMA2000, GPRS, TDMA, GSM, WCDMA, UMTS, and the like.

The back-end system can include one or more computing devices or servers 108, which are connected to the RAN. For example, machine-learning algorithms can be leveraged to identify patterns and predict changes in the network environment, including movement patterns of UEs. Machine learning algorithms include Regression algorithms, Instance-Based algorithms, Regularization algorithms, Decision Tree algorithms, Bayesian algorithms, Clustering algorithms, Association Rule Learning algorithms, Artificial Neural Network algorithms, Deep Learning algorithms, Dimensionality Reduction algorithms, Ensemble algorithms, to name a few.

The initial radio technology selector 110 determines whether 5G or LTE radio access technology should be used for the initial user-data leg. The selection process used by the radio technology selector 110 is described in detail elsewhere herein, for example, with reference to FIGS. 2-5. At a high level, the initial radio technology selector 110 may determine geographic subunits of an overlapping coverage area that have low performance on one of the two radio access technologies. In these low performing subareas, the technology with the best performance may be selected for the initial user-data leg.

Preliminarily, a determination may be made that the UE is located at a point in the communication network served by two or more radio technologies, such as 5G and LTE. An additional determination may be made that the UE is able to access the network on the two or more radio technologies (i.e., is 5G and LTE capable). Additionally, the type of communication session may dictate whether the selection process is initiated. In one aspect, the selection process is initiated when the communication session is for a phone call, videoconference, or other real time exchange of live audio or video data. In contrast, when the communication session is for streaming a song or video the selection process may be skipped or any recommendation generated from the selection process down weighted. The reason for this is that the user is less likely to experience a noticeable disruption while streaming a song or video because of buffering, among other factors, than when engaging a live exchange of information.

Next, the radio technology selector 110 determines whether the UE is in a high performing or low performing subunit of its coverage area. Each node may be associated with an initial radio technology selector 110. Further, each node may designate each subunit in its overlapping coverage area as either LTE high or low performing and 5G high or low performing. High or low may be assigned using a threshold for one or more quality metrics that measure accessibility, retainabilty, and data throughput. Individual metric threshold may be used or the metrics could be combined into a single composite metric, in which case a single threshold is used. The composite metric may be a weighted combination of quality metrics. In aspects, the same or different weight may be given to each weight. In aspects, a normalization step that transforms the various measures into comparable units or values may be employed. For example, each metric may be normalized into a percentage performance against a baseline measure for the metric. In one aspect, a configuration message designates the radio technology to be used for the initial user-data leg.

Figure 2:
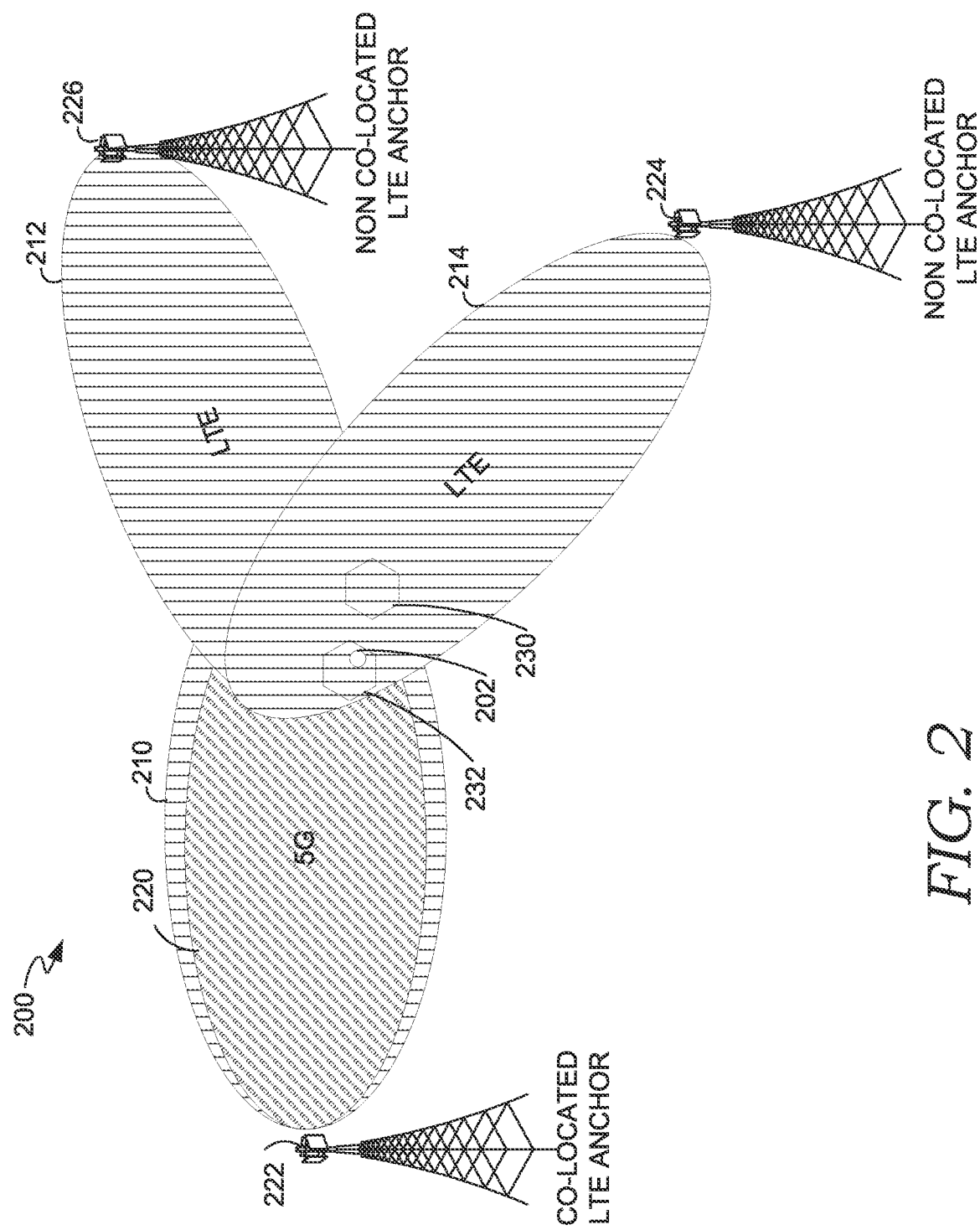
FIG. 2 depicts an exemplary coverage area with overlapping radio technology coverage areas, according to an implementation of an embodiment of the present invention.

In FIG. 2, a wireless telecommunications network 200 is shown with LTE coverage areas 210, 212, and 214. LTE coverage areas 210, 212, and 214 may comprise a BTS to transmit and receive RF signals with UEs, such as UE 202. In FIG. 2, LTE coverage areas 210, 212, and 214 define an area where RF signals are transmitted using the LTE radio technology and received by an access point. LTE coverage area 210 is enabled by an eNodeB at BTS 222, which is described as a co-located LTE anchor because a 5G node is also located at BTS 222. LTE coverage area 214 is enabled by an eNodeB at BTS 224, which is described as a non co-located LTE anchor because a 5G node is not located at BTS 224. LTE coverage area 212 is enabled by an eNodeB at BTS 226, which is described as a non co-located LTE anchor because a 5G node is not located at BTS 226.

FIG. 2 also includes 5G coverage area 220. 5G coverage area 220 may comprise a BTS to transmit and receive RF signals with UEs, such as UE 202. In FIG. 2, 5G coverage area 220 defines an area where RF signals are transmitted using 5G radio technology and received by an access point for communication purposes. 5G coverage area 220 is enabled by a gNodeB at BTS 222.

FIG. 2 illustrates a context in which aspects the technology described herein may help avoid a disruption of the user experience. The UE 202 is located within LTE coverage areas 210, 212, and 214 and 5G coverage area 220. With the UE 202 in this location, an EN-DC communication session may be initiated. The technology may then determine whether LTE or 5G technology be used for the initial user-data leg. In some circumstances, the technology may select between multiple LTE or 5G services, such as provided by different nodes or in different frequency bands. In this context, the two technologies do not have overlapping coverage in much of the area depicted, but overlapping coverage can be provided by three different combinations around UE 202. In each combination, the 5G leg originates at BTS 222 and is represented by 5G-coverage area 220. The LTE leg can be provided by the eNodeB at BTS 222, 224, or 226.

The eNodeBs at BTS 222, 224, and 226 may each have their own performance designation for the geographic subunit of the coverage area in which UE 202 is located. The designation is based on performance data gathered by each respective eNodeB. Hexbin 230 and hexbin 232 are both located in whole, or in part, in coverage areas 210, 212, 214, and 220. UE 202 is located within hexbin 230. Each of the nodes at BTS 222, 224, and 226 could assign their own performance designation to hexbin 230 and hexbin 232. For example, the BTS 222 could designate hexbin 230 as high performing, while the BTS 224 designates hexbin 230 as low performing. The different designation is a result of different performance data gathered by the two BTSs. As mentioned, each BTS may gather performance data when the BTS is managing the communication session. In other aspects, the performance data may be shared between different BTSs.

The performance data can measure various characteristics of a communication session related to quality. A set of performance data may be collected by each eNodeB from UEs operating in its coverage area. The characteristics include 5G availability, 5G throughput, and 5G retainability, LTE availability, LTE throughput, and LTE retainability. Measuring other performance characteristics is possible and these three are just provided as an example. In one aspect, an average or mean performance measure is calculated for each geographic subunit in a coverage area. Thus, an average 5G availability, average 5G throughput, and average 5G retainability could be calculated for each geographic subunit. In one aspect, the characteristics are combined to form a performance score. For example, each characteristic could be normalized to a common scale, such as a number between 0 and 1. The normalized measures could then be combined to form a single measure that is compared to a single threshold. In an aspect, the normalized measures could be combined in such a way that gives different weight to different characteristics. LTE scores could be combined in a similar way. And when multiple LTE services or 5G services are available, then each service could receive a score.

A high or low performance designation is assigned by comparing the measured performance to a threshold. In an aspect, only a single characteristic is used to designate a geographic subunit as low or high quality. For example, if 5G accessibility is outside of a designated range, then the corresponding geographic subunit may be classified as low performing. Each characteristic could have its own threshold range. In one aspect, a geographic subunit is classified as low performing if any single characteristic associated with the geographic subunit falls below a threshold for the corresponding characteristic. The thresholds may be set based on a number of factors. In one aspect, the thresholds are based on a likelihood the secondary leg will be used during an average communication session if the thresholds are not met on the initial leg. For example, the average throughput of a communication session could serve as the threshold for throughput. Alternatively, one standard deviation above average could be used.

Figure 3:
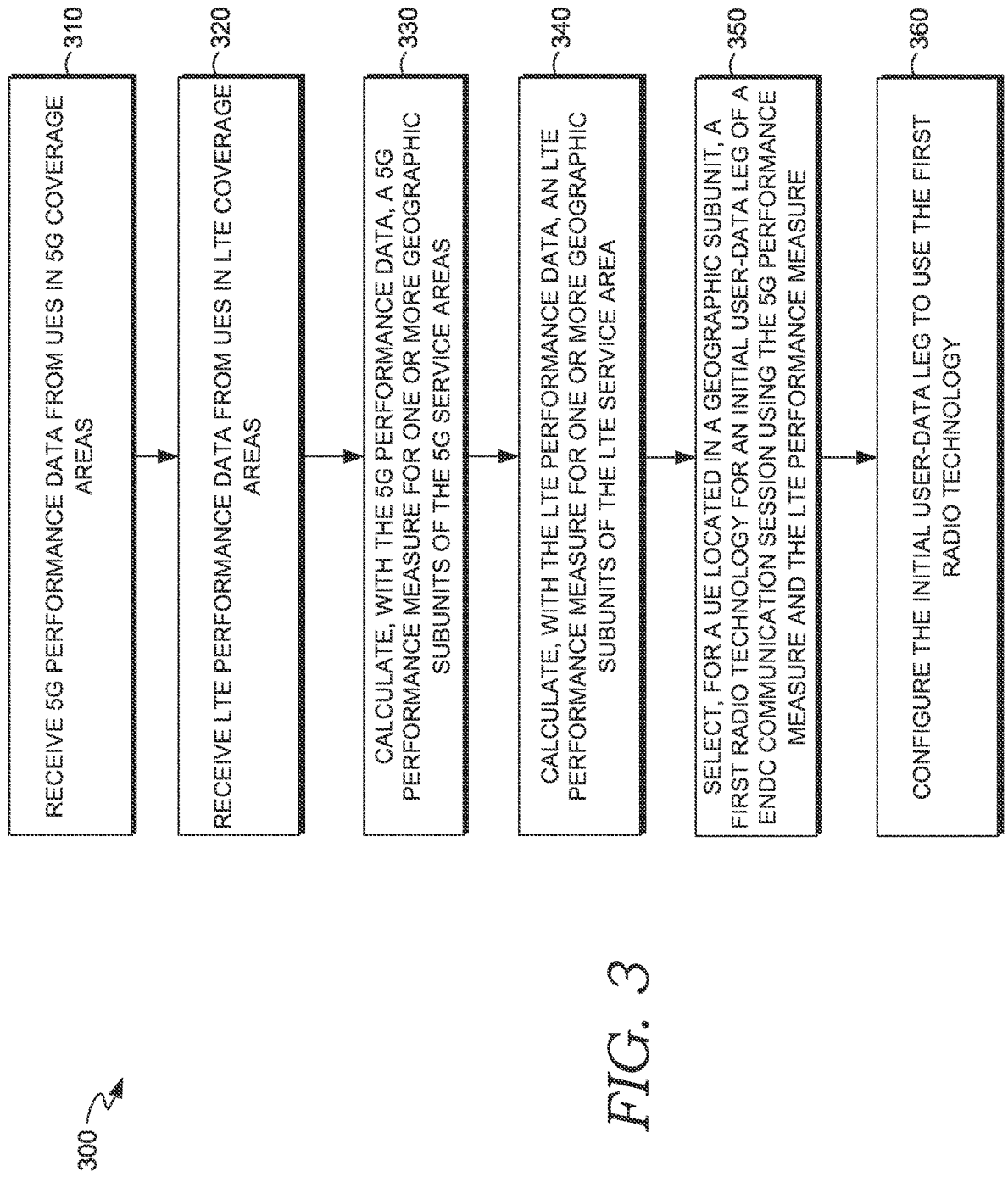
FIGS. 3-5 show methods for avoiding interference by selecting a radio technology for use in an initial user-data leg of a communication session, according to an implementation of an embodiment of the present invention.
Figure 4:
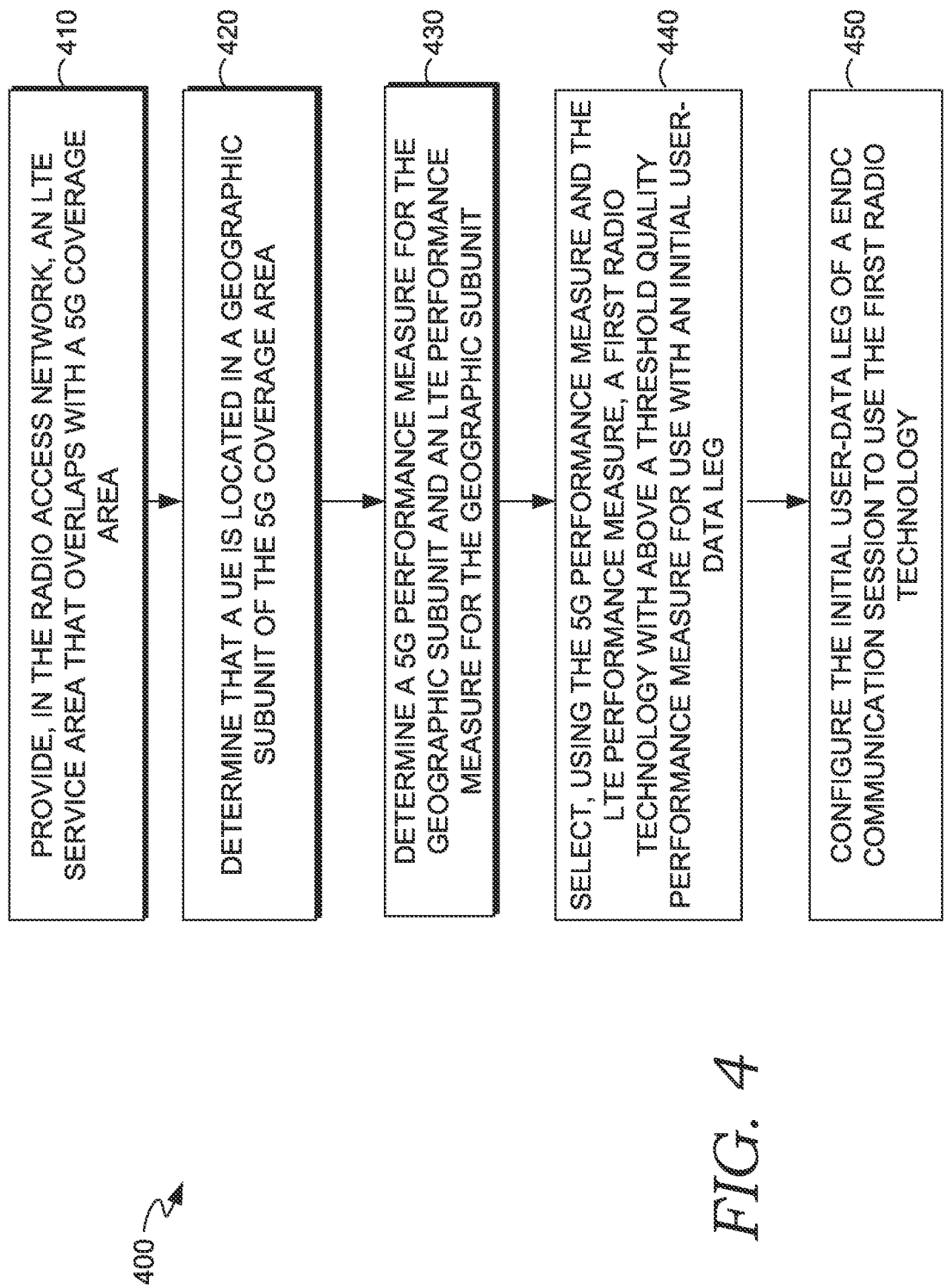
Figure 5:
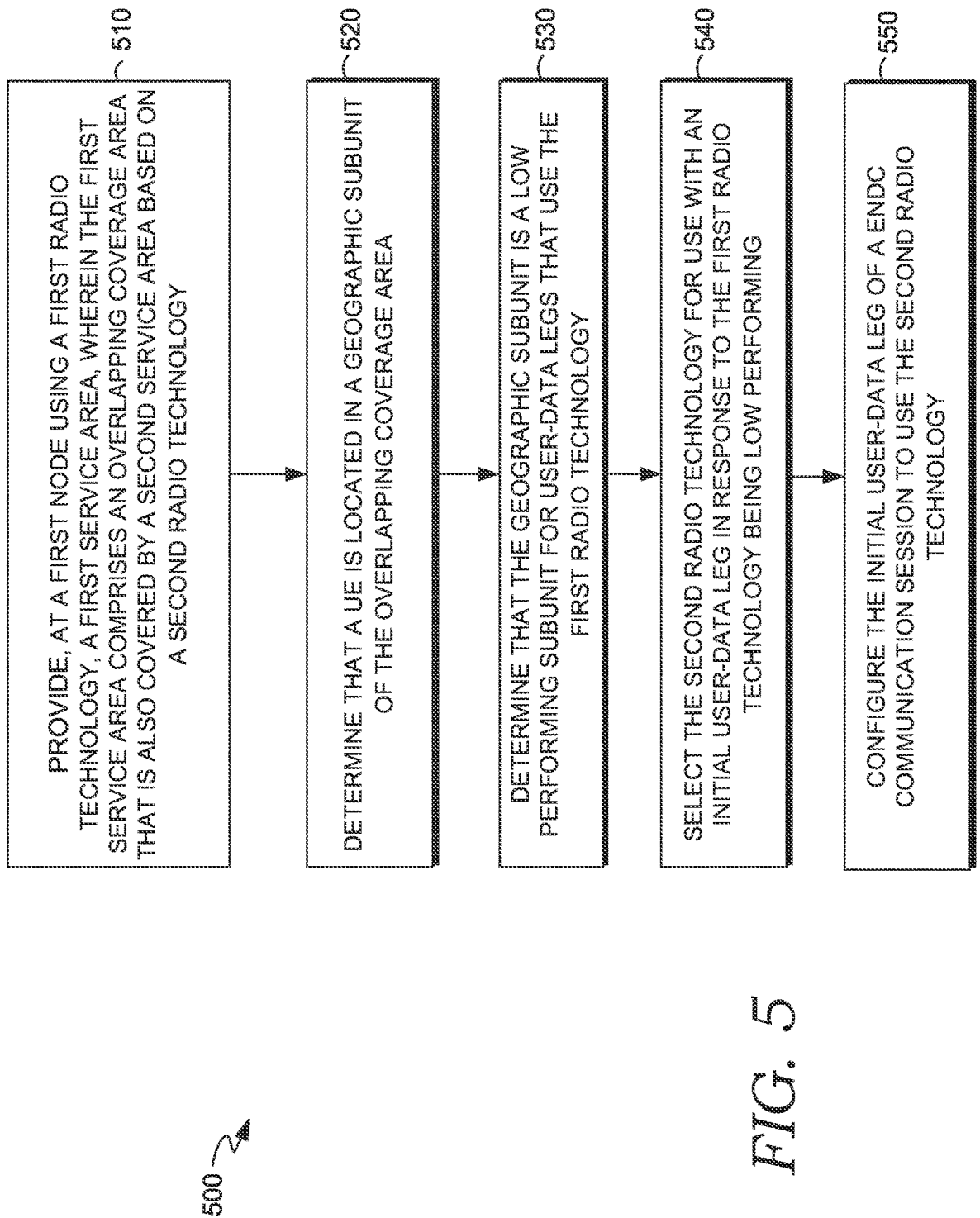

Now referring to FIGS. 3-5, each block of methods 300, 400, and 500, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), or a plug-in to another product, to name a few. In addition, methods 300, 400, and 500 are described, by way of example, with respect to the radio technology selector 110 of FIG. 1 and additional features of FIG. 2. However, these methods may additionally or alternatively be executed by any one system, or any combination of systems, including, but not limited to, those described herein.

FIG. 3 is a flow diagram showing a method 300 for avoiding interference by selecting a radio technology for use during a communication session between a user equipment (UE) and a communication network that is capable of communication with two or more radio technologies, in accordance with some embodiments of the present disclosure.

At step 310, the method includes, receiving 5G performance data from UEs in 5G coverage areas. The performance data can measure various characteristics of a communication session related to quality. A set of performance data may be collected by each eNodeB from UEs operating in its coverage area. The characteristics include 5G availability, 5G throughput, and 5G retainability. Measuring other performance characteristics is possible and these three are just provided as an example.

At step 320, the method includes, receiving LTE performance data from UEs in LTE coverage areas. The performance data can measure various characteristics of a communication session related to quality. A set of performance data may be collected by each eNodeB from UEs operating in its coverage area. The characteristics include LTE availability, LTE throughput, and LTE retainability. Measuring other performance characteristics is possible and these three are just provided as an example.

At step 330, the method includes calculating, with the 5G performance data, a 5G performance measure for one or more geographic subunits of the 5G service areas. In one aspect, an average or mean performance measure is calculated for each geographic subunit in a coverage area. Thus, an average 5G availability, average 5G throughput, and average 5G retainability could be calculated for each geographic subunit. In one aspect, the characteristics are combined to form a performance score. For example, each characteristic could be normalized to a common scale, such as a number between 0 and 1. The normalized measures could then be combined to form a single measure that is compared to a single threshold. In another aspect, the normalized measures could be combined in such a way that gives different weight to different characteristics.

At step 340, the method includes calculating, with the LTE performance data, a LTE performance measure for one or more geographic subunits of the LTE service areas. In one aspect, an average or mean performance measure is calculated for each geographic subunit in a coverage area. Thus, an average LTE availability, average LTE throughput, and average LTE retainability could be calculated for each geographic subunit. In one aspect, the characteristics are combined to form a performance score. For example, each characteristic could be normalized to a common scale, such as a number between 0 and 1. The normalized measures could then be combined to form a single measure that is compared to a single threshold. In another aspect, the normalized measures could be combined in such a way that gives different weight to different characteristics.

At step 350, the method includes selecting, for a UE located in a geographic subunit, a first radio technology for an initial user-data leg of an ENDC communication session using the 5G performance measure and the LTE performance measure. In areas where the LTE is high performing and the 5G is low performing then LTE is selected. In areas where the 5G is high performing and the LTE is low performing then 5G is selected. In areas where both LTE and 5G are low performing, LTE may be selected as a default. Alternatively, a comparison of the LTE performance score and the 5G performance score may be used to select the better performing access technology, even though both are classified as low performing. In areas where both LTE and 5G are high performing, 5G may be selected as a default. Alternatively, a comparison of the LTE performance score and the 5G performance score may be used to select the better performing access technology, even though both are classified as high performing.

At step 360, the method includes configuring the initial user-data leg to use the first radio technology. In one aspect, a configuration message specifies the initial access technology for the user-data leg.

FIG. 4 is a flow diagram showing a method 400 for avoiding interference by selecting a radio technology for use during a communication session between a user equipment (UE) and a communication network that is capable of communication with two or more radio technologies, in accordance with some embodiments of the present disclosure.

At step 410, the method includes providing, in the radio access network, an LTE service area that overlaps with a 5G coverage area.

At step 420, the method includes determining that a UE is located in a geographic subunit of the 5G coverage area. The location of the UE may be determined from location information provided by the UE. The location can be used to associate the UE with a hexbin or other subunit measure.

At step 430, the method includes determining a 5G performance measure for the geographic subunit and an LTE performance measure for the geographic subunit. The performance measure assigned to the hexbin (e.g., geographic subunit) may be looked up from a data store. The performance measure may be a high/low performance designation. In an aspect, only a single characteristic is used to designate a geographic subunit as low or high quality. For example, if 5G accessibility is outside of a designated range, then the corresponding geographic subunit may be classified as low performing for 5G. Each characteristic could have its own threshold range. In one aspect, a geographic subunit is classified as low performing LTE or low performing 5G if any single characteristic associated the corresponding radio access technology falls below the threshold.

At step 440, the method includes selecting, using the 5G performance measure and the LTE performance measure, a first radio technology with above a threshold quality performance measure for use with an initial user-data leg. In areas where the LTE is high performing and the 5G is low performing then LTE is selected. In areas where the 5G is high performing and the LTE is low performing then 5G is selected. In areas where both LTE and 5G are low performing, LTE may be selected as a default. Alternatively, a comparison of the LTE performance score and the 5G performance score may be used to select the better performing access technology, even though both are classified as low performing. In areas where both LTE and 5G are high performing, 5G may be selected as a default. Alternatively, a comparison of the LTE performance score and the 5G performance score may be used to select the better performing access technology, even though both are classified as high performing.

At step 450, the method includes configuring the initial user-data leg of an ENDC communication session to use the first radio technology. In one aspect, a configuration message specifies the initial access technology for the user-data leg.

FIG. 5 is a flow diagram showing a method 500 for avoiding interference by selecting a radio technology for use during a communication session between a user equipment (UE) and a communication network that is capable of communication with two or more radio technologies, in accordance with some embodiments of the present disclosure.

At step 510, the method includes providing, at a first node using a first radio technology, a first service area, wherein the first service area comprises an overlapping coverage area that is also covered by a second service area based on a second radio technology. The first node could be an eNodeB. The second service could be provided by a second node, such as a gNodeB, which is a 3GPP-compliant implementation of the 5G-NR base station. The second node may not be co-located with the first node or it could be co-located.

At step 520, the method includes determining that a UE is located in a geographic subunit of the overlapping coverage area. This determination may be made by analyzing location data (e.g., GPS data) from a UE and comparing it to a coverage area map.

At step 530, the method includes determining that the geographic subunit is a low performing subunit for user-data legs that use the first radio technology. The thresholds for "low performing" may be set based on a number of factors. The performance data can measure various characteristics of a communication session related to quality. A set of performance data may be collected by each eNodeB from UEs operating in its coverage area. The characteristics include 5G availability, 5G throughput, and 5G retainability, LTE availability, LTE throughput, and LTE retainability. Measuring other performance characteristics is possible and these three are just provided as an example. In one aspect, an average or mean performance measure is calculated for each geographic subunit in a coverage area. Thus, an average 5G availability, average 5G throughput, and average 5G retainability could be calculated for each geographic subunit. In one aspect, the characteristics are combined to form a performance score. For example, each characteristic could be normalized to a common scale, such as a number between 0 and 1. The normalized measures could then be combined to form a single measure that is compared to a single threshold. In an aspect, the normalized measures could be combined in such a way that gives different weight to different characteristics. LTE scores could be combined in a similar way. And when multiple LTE services or 5G services are available, then each service could receive a score.

A high or low performance designation is assigned by comparing the measured performance to a threshold. In an aspect, only a single characteristic is used to designate a geographic subunit as low or high quality. For example, if 5G accessibility is outside of a designated range, then the corresponding geographic subunit may be classified as low performing. Each characteristic could have its own threshold range. In one aspect, a geographic subunit is classified as low performing if any single characteristic associated with the geographic subunit falls below a threshold for the corresponding characteristic. The thresholds may be set based on a number of factors. In one aspect, the thresholds are based on a likelihood the secondary leg will be used during an average communication session if the thresholds are not met on the initial leg. For example, the average throughput of a communication session could serve as the threshold for throughput. Alternatively, one standard deviation above average could be used.

At step 540, the method includes selecting the second radio technology for use with an initial user-data leg in response to the first radio technology being low performing. In areas where the LTE is high performing and the 5G is low performing then LTE is selected. In areas where the 5G is high performing and the LTE is low performing then 5G is selected. In areas where both LTE and 5G are low performing, LTE may be selected as a default. Alternatively, a comparison of the LTE performance score and the 5G performance score may be used to select the better performing access technology, even though both are classified as low performing. In areas where both LTE and 5G are high performing, 5G may be selected as a default. Alternatively, a comparison of the LTE performance score and the 5G performance score may be used to select the better performing access technology, even though both are classified as high performing.

At step 550, the method includes configuring the initial user-data leg of an ENDC communication session to use the second radio technology. In one aspect, a configuration message specifies the initial access technology for the user-data leg.

Figure 6:
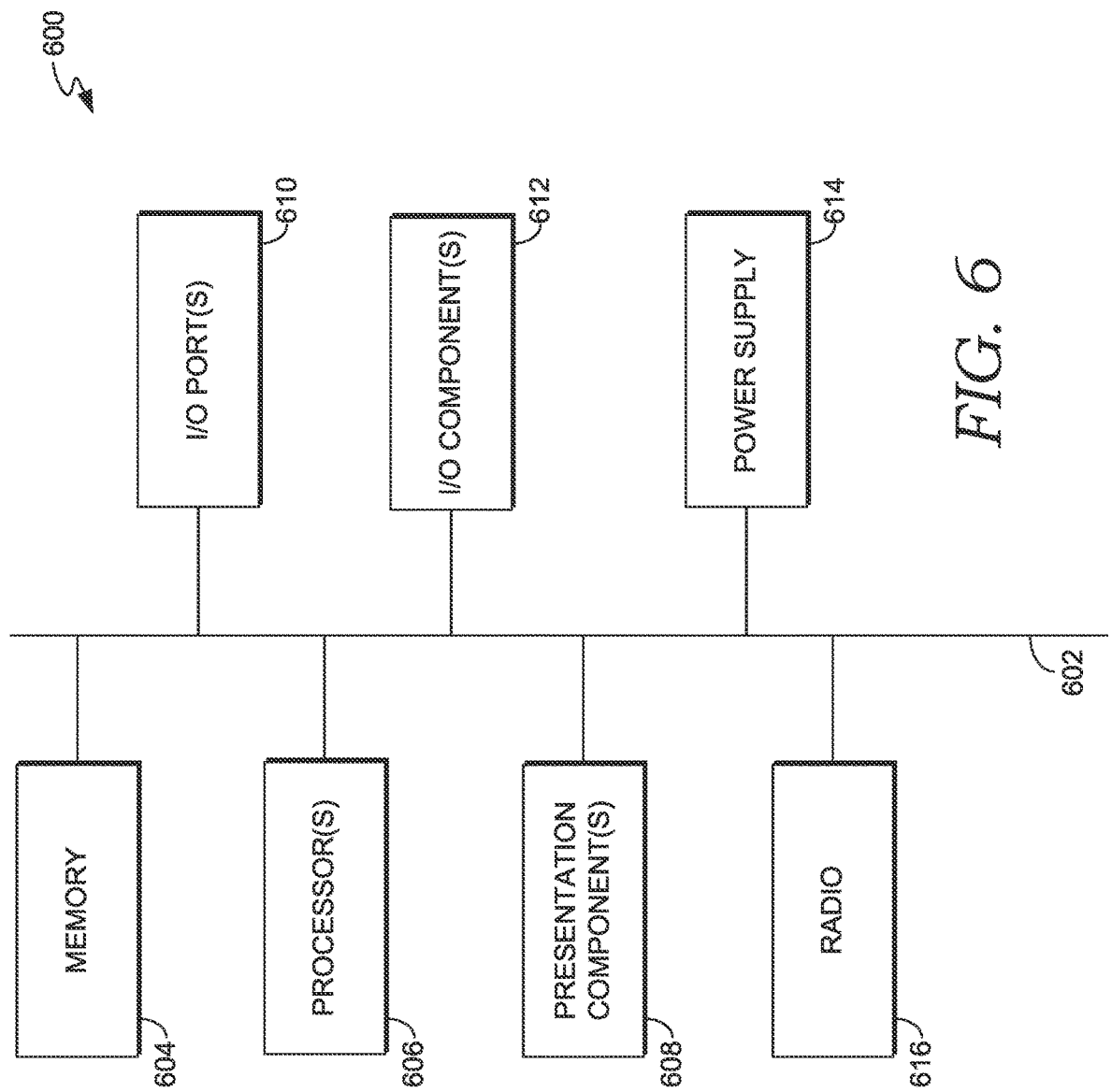
FIG. 6 depicts a block diagram of an exemplary computing environment suitable for use in implementing embodiments herein.

With reference to FIG. 6, computing device 600 includes a bus 602 that directly or indirectly couples the following devices: memory 604, one or more processors 606, one or more presentation components 608, input/output (I/O) ports 610, input/output (I/O) components 612, and an illustrative power supply 614. Bus 602 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterate that the diagram of FIG. 6 is merely illustrative of an example computing device that can be used in connection with one or more embodiments of the present invention. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media is non-transitory. In contrast to communication media, computer storage media is not a modulated data signal or any signal per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 604 includes computer-storage media in the form of volatile and/or nonvolatile memory. The memory may be removable, non-removable, or a combination thereof. Example hardware devices include solid-state memory, hard drives, optical-disc drives, etc. Computing device 600 includes one or more processors that read data from various entities such as memory 604 or I/O components 612. Presentation component(s) 608 present data indications to a user or other device. Example presentation components include a display device, speaker, printing component, vibrating component, etc.

I/O ports 610 allow computing device 600 to be logically coupled to other devices including I/O components 612, some of which may be built in. Illustrative components include a microphone, joystick, game pad, satellite dish, scanner, printer, wireless device, etc.

Radio 616 represents a radio that facilitates communication with a wireless telecommunications network. Illustrative wireless telecommunications technologies include CDMA, GPRS, TDMA, GSM, W-CDMA, EDGE, CDMA2000, and the like. Radio 616 might additionally or alternatively facilitate other types of wireless communications including Wi-Fi, WiMAX, LTE, 5G, or other VoIP communications. As can be appreciated, in various embodiments, radio 616 can be configured to support multiple technologies and/or multiple radios can be utilized to support multiple technologies.

The invention claimed is:
1. A method for selecting a radio technology for use during an ENDC communication session between a user equipment (UE) and a radio access network, comprising:
    defining a plurality of geographic subunits for a coverage area of the radio access network;
    receiving 5G performance data from UEs in 5G coverage areas;
    receiving LTE performance data from UEs in LTE coverage areas;

aggregating the 5G performance data from multiple UEs to form aggregated 5G performance data for a geographic subunit;
aggregating the LTE performance data from multiple UEs to form aggregated LTE performance data for the geographic subunit, where the 5G coverage areas and LTE coverage areas overlap within the geographic subunit, wherein the geographic subunit is one of the plurality of geographic subunits in an overlapping coverage area;
calculating, with the aggregated 5G performance data, a 5G performance measure for the geographic subunit;
calculating, with the aggregated LTE performance data, an LTE performance measure for the geographic subunit;
transforming each of the 5G performance measure and the LTE performance measure into a percentage performance that is compared to a threshold quality performance measure;
selecting, at an initial radio technology selector, for a UE located in the geographic subunit, a first radio technology for an initial user-data leg of an ENDC communication session using the 5G performance measure and the LTE performance measure, wherein the selection process is initiated when the ENDC communication session is for a phone call, videoconference, or other real time exchange of live audio or video data; and
configuring the initial user-data leg to use the first radio technology.

2. The method of claim 1, wherein the first radio technology is 5G.

3. The method of claim 1, wherein the geographic subunit is served by a first 5G service provided in a first frequency band and a second 5G service provided in a second frequency band, and wherein the first radio technology is selected from one of the first 5G service, the second 5G service, and an LTE service.

4. The method of claim 1, wherein the selecting comprises determining that all available radio technologies for the geographic subunit perform below a designated quality threshold and, in response, selecting LTE radio technology for the first radio technology.

5. The method of claim 1, wherein the selecting comprises determining that all available radio technologies for the geographic subunit perform above a designated quality threshold and, in response, selecting 5G radio technology for the first radio technology.

6. The method of claim 1, wherein the aggregated 5G performance data comprises throughput on 5G user-data legs.

7. The method of claim 1, wherein portions of the 5G coverage area are provided by a 5G node that is not co-located with an LTE node.

8. The method of claim 1, wherein the one or more geographic subunits are hexagonal bins.

9. A method for selecting a radio technology for use during an ENDC communication session between a user equipment (UE) and a radio access network, comprising:
defining a plurality of geographic subunits for a coverage area of the radio access network;
providing, in the radio access network, an LTE service area that overlaps with a 5G coverage area;
determining that a UE is located in a geographic subunit of the 5G coverage area, which overlaps with the LTE service area;
determining a 5G performance measure for the geographic subunit by aggregating historical 5G performance data from multiple UEs, wherein the geographic subunit is one of the plurality of geographic subunits in an overlapping coverage area;
determining an LTE performance measure for the geographic subunit, by aggregating historical LTE performance data from multiple UEs, wherein the geographic subunit is one of a plurality of geographic subunits in an overlapping coverage area;
transforming each of the 5G performance measure and the LTE performance measure into a percentage performance that is compared to a threshold quality performance measure;
selecting, at an initial radio technology selector, using the 5G performance measure and the LTE performance measure, a first radio technology with above the threshold quality performance measure for use with an initial user-data leg, wherein the selection process is initiated when the ENDC communication session is for a phone call, videoconference, or other real time exchange of live audio or video data; and
configuring the initial user-data leg of an ENDC communication session to use the first radio technology.

10. The method of claim 9, wherein the 5G performance measure is a combination of an accessibility metric, a retainability metric, and a throughput metric.

11. The method of claim 9, wherein the selecting comprises determining that all available radio technologies for the geographic subunit perform above a designated quality threshold and, in response, selecting 5G radio technology for the first radio technology.

12. The method of claim 9, wherein the geographic subunit is served by a first 5G service provided in a first frequency band and a second 5G service provided in a second frequency band, and wherein the first radio technology is selected from one of the first 5G service, the second 5G service, and an LTE service.

13. The method of claim 9, wherein individual nodes in the radio access network determine a performance designation of geographic subunits within coverage areas provided by the individual nodes.

14. The method of claim 9, wherein the 5G node is not co-located with the LTE node.

15. One or more computer non-transitory storage media comprising computer executable instructions embodied thereon, which when executed by a computing device cause the computing device to perform a method for selecting a radio technology for use during an ENDC communication session between a user equipment (UE) and a radio access network, comprising:
defining a plurality of geographic subunits for a coverage area of the radio access network;
providing, at a first node using a first radio technology, a first service area, wherein the first service area comprises an overlapping coverage area that is also covered by a second service area based on a second radio technology;
determining that a UE is located in a geographic subunit of the overlapping coverage area, wherein the geographic subunit is one of the plurality of geographic subunits in an overlapping coverage area;
determining that the geographic subunit is a low performing geographic subunit for user-data legs that use the first radio technology based on historical performance data aggregated from multiple UEs, wherein the historical performance data comprises aggregated 5G performance data and aggregated LTE performance data, wherein a 5G performance measure for the geographic subunit is calculated based on the aggregated 5G performance data, wherein an LTE performance measure for the geographic subunit is calculated based on the aggregated LTE performance data, and wherein each of the 5G performance measure and the LTE performance measure are transformed into a percentage performance that is compared to a threshold quality performance measure;

selecting, at an initial radio technology selector, the second radio technology for use with an initial user-data leg in response to the first radio technology being low performing, wherein the selection process is initiated when an ENDC communication session is for a phone call, videoconference, or other real time exchange of live audio or video data; and configuring the initial user-data leg of the ENDC communication session to use the second radio technology.

16. The media of claim 15, wherein the initial user-data leg is an uplink leg.

17. The media of claim 15, wherein the geographic subunit is low performing when a quality metric derived from performance data received from UEs in the geographic subunit is within a range used to define low performing.

18. The media of claim 17, wherein the quality metric is based on one or more of an accessibility metric, a retainability metric, and a throughput metric.

19. The media of claim 17, wherein the quality metric is a throughput metric.

20. The media of claim 15, wherein the geographic subunit is served by a first 5G service provided in a first frequency band and a second 5G service provided in a second frequency band, and wherein the first radio technology is selected from one of the first 5G service, the second 5G service, and an LTE service.

* * * * *